United States Patent
Prochaska et al.

(10) Patent No.: US 10,226,718 B2
(45) Date of Patent: *Mar. 12, 2019

(54) METHOD AND DEVICE FOR DISTILLATIVE SEPARATION OF A THREE- OR MULTI-COMPONENT MIXTURE

(71) Applicant: Wacker Chemie AG, Munich (DE)

(72) Inventors: Jan Prochaska, Mehring (DE);
Maximilian Aigner, Aachen (DE);
Helmut Jansen, Dormagen (DE)

(73) Assignee: WACKER CHEMIE AG, Munich (DE)

( * ) Notice: Subject to any disclaimer, the term of this patent is extended or adjusted under 35 U.S.C. 154(b) by 236 days.

This patent is subject to a terminal disclaimer.

(21) Appl. No.: 14/907,939

(22) PCT Filed: Jul. 22, 2014

(86) PCT No.: PCT/EP2014/065718
§ 371 (c)(1),
(2) Date: Jan. 27, 2016

(87) PCT Pub. No.: WO2015/014671
PCT Pub. Date: Feb. 5, 2015

(65) Prior Publication Data
US 2016/0166947 A1    Jun. 16, 2016

(30) Foreign Application Priority Data

Jul. 29, 2013 (DE) .......................... 10 2013 214 765

(51) Int. Cl.
*B01D 3/14* (2006.01)
*C01B 33/107* (2006.01)

(52) U.S. Cl.
CPC ............. *B01D 3/141* (2013.01); *B01D 3/143* (2013.01); *C01B 33/10778* (2013.01)

(58) Field of Classification Search
CPC ................................. B01D 3/141; B01D 3/143
See application file for complete search history.

(56) References Cited

U.S. PATENT DOCUMENTS 3,007,956 A  * 11/1961  Linville ................. C07F 7/121
                                                          159/25.1
4,162,198 A  *  7/1979  Stockburger ............. B01D 3/40
                                                          203/23

(Continued)

FOREIGN PATENT DOCUMENTS

CA        1217449 A  *  2/1987  ............... C07C 1/00
CA        1217449 A       2/1987

(Continued)

OTHER PUBLICATIONS

EP0141356 ENG (English translation of Lindner, EP0141356. Oct. 19, 1984).*

(Continued)

*Primary Examiner* — Renee Robinson
*Assistant Examiner* — Gabriel E Gitman
(74) *Attorney, Agent, or Firm* — Brooks Kushman P.C.

(57) ABSTRACT

Efficient distillative separation of an at least three component mixture containing high boiler, medium boiler and low boiler components is accomplished by interposing a column having a stripping section and a rectifying section separated from each other by a horizontal impermeable dividing wall between conventional distillation columns. High efficiency and low capital cost is achieved.

17 Claims, 4 Drawing Sheets

(56) References Cited

U.S. PATENT DOCUMENTS

| | | | |
|---|---|---|---|
| 5,120,338 A | 6/1992 | Potts, Jr. et al. | |
| 5,914,012 A | 6/1999 | Kaibel et al. | |
| 6,635,148 B1* | 10/2003 | Nishimura | B01D 3/14 |
| | | | 159/27.1 |
| 6,884,324 B2 | 4/2005 | Gutermuth et al. | |
| 9,089,788 B2* | 7/2015 | Paetzold | B01D 3/143 |
| 2001/0010286 A1 | 8/2001 | Wostbrock et al. | |
| 2003/0181772 A1* | 9/2003 | Meyer | B01D 3/141 |
| | | | 585/324 |
| 2003/0205451 A1 | 11/2003 | Briegel et al. | |
| 2008/0081933 A1 | 4/2008 | Bastings et al. | |
| 2009/0203951 A1* | 8/2009 | Kurukchi | B01D 3/007 |
| | | | 585/648 |
| 2010/0224536 A1* | 9/2010 | Schultz | B01D 3/14 |
| | | | 208/363 |
| 2011/0178328 A1 | 7/2011 | Merenov et al. | |
| 2012/0085126 A1* | 4/2012 | Gupta | B01D 1/28 |
| | | | 62/617 |
| 2014/0014493 A1* | 1/2014 | Ryan | B01J 19/30 |
| | | | 203/89 |

FOREIGN PATENT DOCUMENTS

| | | | |
|---|---|---|---|
| CN | 1454887 A | 11/2003 | |
| CN | 101489964 A | 7/2009 | |
| DE | 195 47 450 A1 | 6/1997 | |
| EP | 0141356 A2 | 5/1985 | |
| EP | 0 804 951 A2 | 11/1997 | |
| JP | 2014-097474 A * | 5/2014 | B01D 3/42 |
| WO | 2008092575 A1 | 8/2008 | |
| WO | 2009092682 A2 | 7/2009 | |

OTHER PUBLICATIONS

JPA_2014097474_ENG (J Pat Plat translation of Tachikawa) (Year: 2014).*

Becker et al., "Partitioned Distillation Columns—Why, When & How," Chemical Engineering; Access Intelligence Association, vol. 108, No. 1, New York, NY, Jan. 31, 2001, www.chem.com; p. 68-74,XP001051738, ISSN: 0009-2460.

* cited by examiner

METHOD AND DEVICE FOR DISTILLATIVE SEPARATION OF A THREE- OR MULTI-COMPONENT MIXTURE

CROSS REFERENCE TO RELATED APPLICATIONS

This application is the U.S. National Phase of PCT Appln. No. PCT/EP2014/065718 filed Jul. 22, 2014, which claims priority to German Application No. 10 2013 214 765.1 filed Jul. 29, 2013, the disclosures of which are incorporated in their entirety by reference herein.

BACKGROUND OF THE INVENTION

1. Field of the Invention

The invention relates to a process for distillative separation of a given mixture of three or more components into its constituent parts and also to an apparatus for carrying out the process by suitable use and coupling of two or more distillation columns.

2. Description of the Related Art

Distillative processes are commonly used in chemical engineering in order to thermally separate mixtures of different relative volatility and/or mutually soluble substances. Distillation forms part of the range of thermal separation processes.

Continuous distillative fractionation of multicomponent mixtures can be carried out using various process variants.

In the simplest case, a feed mixture consisting of one low and one high boiler fraction is fractionated into those two constituent parts. The mixture to be separated is introduced between the top and the bottom of the distillation column. The feed inlet divides the column into a stripping section and a rectifying section.

The high-boiler fraction is withdrawn in the bottom of the column. Some of this fraction is evaporated and fed back to the column, for example by natural circulation, to heat the column. The low-boiler fraction exits at the top of the column as vapor and is liquefied in a condenser. Some of this condensate is recycled back into the column and flows downward as reflux in countercurrent to the ascending vapors.

However, in the separation of feed mixtures consisting of a multicomponent mixture into more than two fractions, two or more conventional distillation columns then need to be used. In a simple case, this requires N−1 distillation columns for an N-component mixture.

FIG. 1 shows the a/c path for separation of a three-component mixture ABC comprising low boiler A, middle boiler B and high boiler C.

It is preferable to use the a/c path when the proportion of middle boiler in the feed is at its greatest. The a/c path represents an energetic optimum for this case. The separation in the first column ensues such that the top product contains no high boiler C and the bottom product contains no low boiler A. The middle boiler B is present in both the top fraction and the bottom fraction of the first column. Each of fractions AB and BC is fractionated in a downstream column into the pure products A, B, C. This variant therefore requires three separating steps.

An alternative to coupling two or more distillation columns is provided by dividing wall columns, i.e. columns that prevent transverse mixing of liquid and vapor streams in sections of the column by means of a vertical dividing wall disposed in the longitudinal direction of the column. This column thus comprises a vertical dividing wall which runs along part of the column height and divides the cross section into two segments to the left and right of the dividing wall.

FIG. 3 shows a conventional dividing wall column in which high boiler is led off as bottoms, the medium boiler via the side draw, and the low boiler via the top stream.

In this case it is possible to fractionate, for example, a three component mixture into its three pure component parts, for which two conventional columns would normally be required.

The dividing wall 5 disposed in the longitudinal direction of the column divides the column interior into a feed section 1, a withdrawal section 2, an upper combined rectifying section 33 and a lower combined stripping section 43 (black).

The feed inlet of the mixture to be separated is generally positioned in a central region between an upper and a lower region of the feed section 1. It is also possible to provide one or more further feed inlets between an upper and a lower region of the feed section 1.

In the withdrawal section 2—to the right of the dividing wall—one or more side draws are disposed between an upper and a lower region. It is also possible to provide a further side draw between the lower and a lowest region of the withdrawal section 2.

WO 2009092682 A1 discloses a process for the distillative work-up of 1,5,9-cyclododecatriene (CDT) and an apparatus for carrying out the process. The achievement of the object starts from a process for distillative work-up of crude CDT obtained by trimerization of butadiene.

Dividing wall columns are used to distillatively separate the crude CDT produced as a multicomponent mixture. The dividing wall, which can consist of one plate or of two or more joined individual plates, longitudinally divides the central section of the column into a feed section and a withdrawal section. With regard to separatory internals that can be used in the dividing wall column, both random packings and structured packings or separating trays are useful. It is possible to form the dividing wall from loosely inserted subsegments.

U.S. Pat. No. 6,884,324B2 discloses a column for concentrating phthalic anhydride (PA), this column having two distillation stages, wherein the distillative removal of the low boilers in the crude PA is effected in the first distillation stage and the removal of the high boilers from the pure PA is conducted in the second distillation stage, the two distillation stages being disposed side by side and being completely separated from one another by a vertical wall, wherein the bottom of the first distillation stage is connected to the bottom of the second distillation stage. The bottom of the first distillation stage can be connected to the bottom of the second distillation stage by an overflow pipe. Equally, the bottom of the first distillation stage can be connected to the bottom of the second distillation stage by a pump.

The prior art thus discloses using two or more distillation columns performing different separation functions in an integrated system, or a dividing wall column, to separate multicomponent mixtures.

Using the dividing wall columns described, total savings of approximately 30% can be realized, based on running costs and capital costs, compared to a conventional series connection of two columns. Dividing wall columns are therefore preferable compared to the conventional interconnection of distillation columns.

However, dividing wall columns generally need to have larger dimensions than the corresponding individual apparatuses they are to replace. The construction height of the dividing wall column generally equates to at least the construction height of one of the individual apparatuses and to no more than the sum of the construction heights of the individual apparatuses.

The diameter of the dividing wall column equates, as a function of the hydraulic loading, to at least the smallest diameter of the individual apparatuses and to no more than the greater diameter of the individual apparatuses.

Depending on the separating task (multicomponent mixture), the consequence may be extreme construction heights, high column diameters and therefore high capital costs, which is disadvantageous.

These problems give rise to the objective of the invention.

SUMMARY OF THE INVENTION

The invention is directed to a process for distillative separation of a mixture of three or more components comprising at least one low boiler, at least one middle boiler and at least one high boiler, wherein the mixture of three or more components is supplied to a first distillation column coupled so as to allow mass transfer with a second distillation column, wherein the second distillation column comprises a horizontal dividing wall dividing the stripping section and rectifying section of the second distillation column, wherein the second distillation column is coupled so as to allow mass transfer with a third distillation column, wherein a bottoms fraction comprising at least one high boiler and a tops fraction comprising at least one low boiler are removed from the second distillation column, wherein at least one middle boiler is removed from a side draw of the third distillation column.

DETAILED DESCRIPTION OF THE PREFERRED EMBODIMENTS

Figure 1:
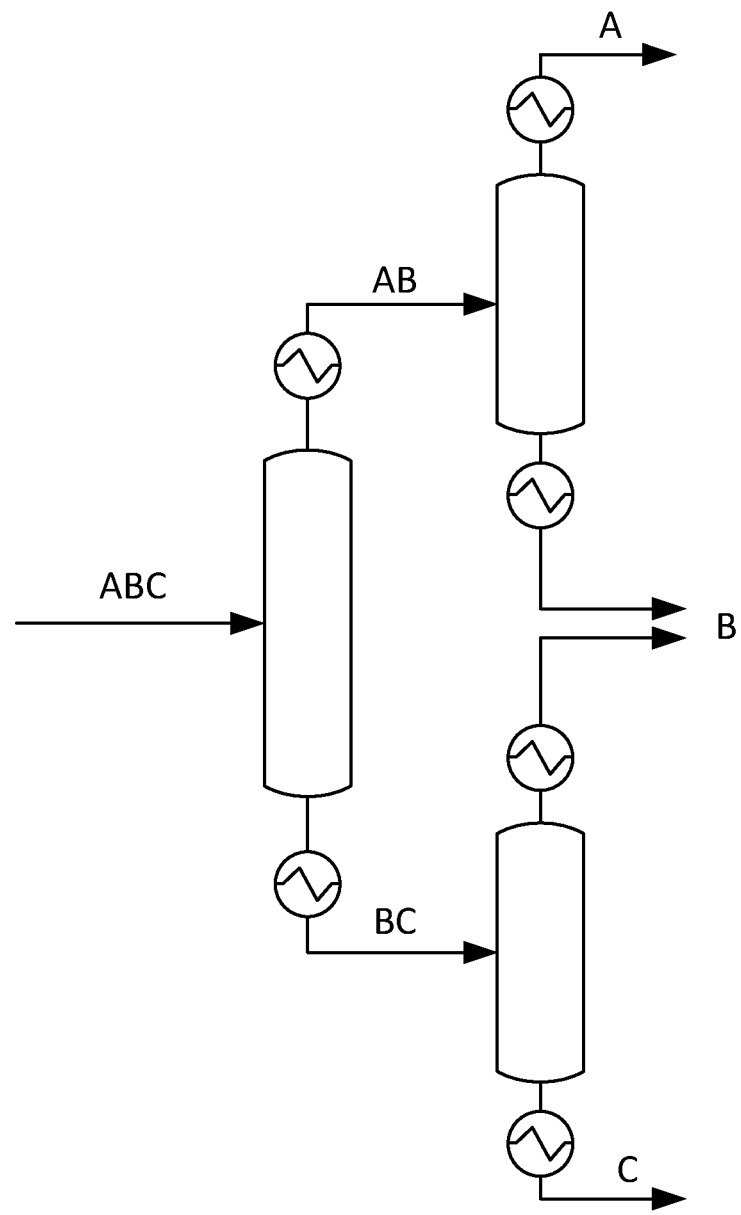
FIG. 1 shows the a/c path for separation of a three-component mixture ABC comprising low boiler A, middle boiler B and high boiler C according to the prior art.

For the purposes of the invention, coupling so as to allow mass transfer is understood to mean that in each case there are appropriate feed and return lines between respective columns.

Three columns, one of which comprises a horizontal dividing wall dividing the stripping section and rectifying section of the column, are coupled so as to allow mass transfer such that the two columns without a dividing wall can effectively be regarded as the left-hand section and the right-hand section of a dividing wall column.

The mixture of three or more components is supplied to a first column which can be regarded as the left-hand section of a dividing wall column.

The vapors of the first column are passed into the second column in which the stripping section is divided from the rectifying section by a horizontal dividing wall, for example a dividing plate.

In this second column, the top product comprising at least one low boiler and the bottom product comprising at least one high boiler are removed.

In a third column, which can be regarded as the right-hand section of a dividing wall column, the target product comprising at least one middle boiler is discharged via a side draw.

The objects of the invention are also achieved by an apparatus for distillative separation of a mixture of three or more components, comprising three distillation columns coupled with one another so as to allow mass transfer such that vapors from a first distillation column are communicatively connected to the rectifying section of a second distillation column and the rectifying section of the second distillation column is communicatively connected to the vapors of a third distillation column and bottom draws from the first distillation column are communicatively connected to the stripping section of the second distillation column and the stripping section of the second distillation column is communicatively connected to the bottom of the third distillation column, wherein the second distillation column comprises a horizontal dividing wall, wherein the third distillation column comprises one or more side draws below the top draw and above the bottom draw.

For the purposes of the invention, communicatively connected is understood to mean that in each case there are appropriate feed and return lines between the respective columns.

The invention therefore relates to an apparatus construction in which an additional column is interconnected with two existing columns in order thus to achieve coupling so as to allow heat and mass transfer.

Inside the second distillation column, the rectifying section is preferably separated from the stripping section by a horizontal impermeable plate.

In terms of the mode of operation the invention is comparable with the principle of a dividing wall column, though it differs in the design of the apparatus, particularly since no vertical dividing plates are necessary in the columns due to the use of an interposed column having a horizontal dividing plate.

The coupling of two columns so as to allow mass transfer is accomplished by each column having at least two linkages, at spatially separate locations, with another column.

Such a column configuration is equivalent in terms of energy requirements to a single dividing wall column having an identical number of plates.

Large energy savings can be realized using this configuration, yet lower capital costs are incurred compared to the new acquisition of a conventional single dividing wall column, since existing columns can be used and only one additional column, which has considerably smaller dimensions than a new dividing wall column, need be procured. The reason for this is that the stripping and rectifying sections of a dividing wall column generally have fewer plates.

Furthermore, the two columns that, in this configuration, are intended to correspond to the dividing wall sections retain the full diameter in this configuration. This distinctly raises the capacity of the plant compared to a dividing wall column, the latter having a diameter equal to that of only one of the two individual columns.

In most cases the capital costs for this configuration will therefore be lower than capital expenditure on an equivalent dividing wall column having identical separation performance and capacity. This makes the invention attractive for revamps, where, simultaneously, the capacity of the plant is to be increased but the specific energy requirements are to be reduced.

The low boiler fraction and the high boiler fraction are withdrawn from the distillation column having a horizontal dividing wall.

The second distillation column having a horizontal dividing wall is preferably provided with a dedicated evaporator and a condenser. The operating pressures of the columns are adjusted such that the prescribed direction of flow is maintained.

The mixture of three or more components is preferably a mixture comprising chlorosilanes or a mixture comprising methylchlorosilanes.

Preference is given to mixtures from TCS or MCS synthesis (TCS=trichlorosilane, MCS=methylchlorosilane) or from the deposition of polycrystalline silicon.

Preference is given to a mixture composed of chlorosilanes comprising TCS, STC, DCS and traces of further impurities (methylchlorosilanes, hydrocarbons, high boilers), as obtained via the reaction of commercially available metallurgical silicon with HCl at 350-400° C. in a fluidized-bed reactor.

In an integrated system for preparing polycrystalline silicon, TCS is produced in a fluidized-bed reactor as a crude silane either from metallurgical silicon and HCl or from metallurgical silicon with STC/$H_2$ (STC=silicon tetrachloride). The crude silane is subsequently purified by distillation/purification to form TCS. Polycrystalline silicon is deposited from the purified TCS, to form, inter alia, STC. Typically, the STC is subsequently utilized (e.g. by hydrogenation to form trichlorosilane or by combustion to form finely divided silica or silicic esters).

During deposition of polycrystalline silicon from a mixture of chlorosilane, more particularly TCS, and hydrogen, a fraction of high-boiling chlorosilanes is formed in addition to STC. Here, the term "high-boiling chlorosilanes" describes compounds which are composed of silicon, chlorine, and, as the case may be, hydrogen, oxygen and carbon and which have a boiling point higher than that of STC (57° C. at 1013 hPa). Preference is given to disilanes $H_nCl_{6-n}Si_2$ (n=0-4) and higher oligo(chloro)silanes, preferably having 2 to 4 Si atoms, and also disiloxanes $H_nCl_{6-n}Si_2O$ (n=0-4) and higher siloxanes preferably having 2 to 4 Si atoms including cyclic oligosiloxanes and also their methyl derivatives.

The residues (high boilers) of the Müller-Rochow process are essentially is tetrachlorodimethyldisilane, trichlorotrimethyldisilane and dichlorotetramethyldisilane, i.e., methylchlorodisilanes of general composition $Me_{6-x}Cl_xSi_2$. These can be treated with metallurgical silicon and HCl at a temperature of at least 300° C. This causes TCS and STC to form.

The high boilers in the off-gas from the deposition of polycrystalline silicon (Siemens process) are mainly chlorodisilanes of the general composition $H_{6-x}Cl_xSi_2$ and, as the case may be, chlorodisiloxanes $H_{6-x}Cl_xSi_2O$. In addition the off-gases comprise TCS, STC and DCS.

Preferred embodiments of the invention and their differences from the prior art are also illustrated hereinafter with the aid of figures.

Figure 4:
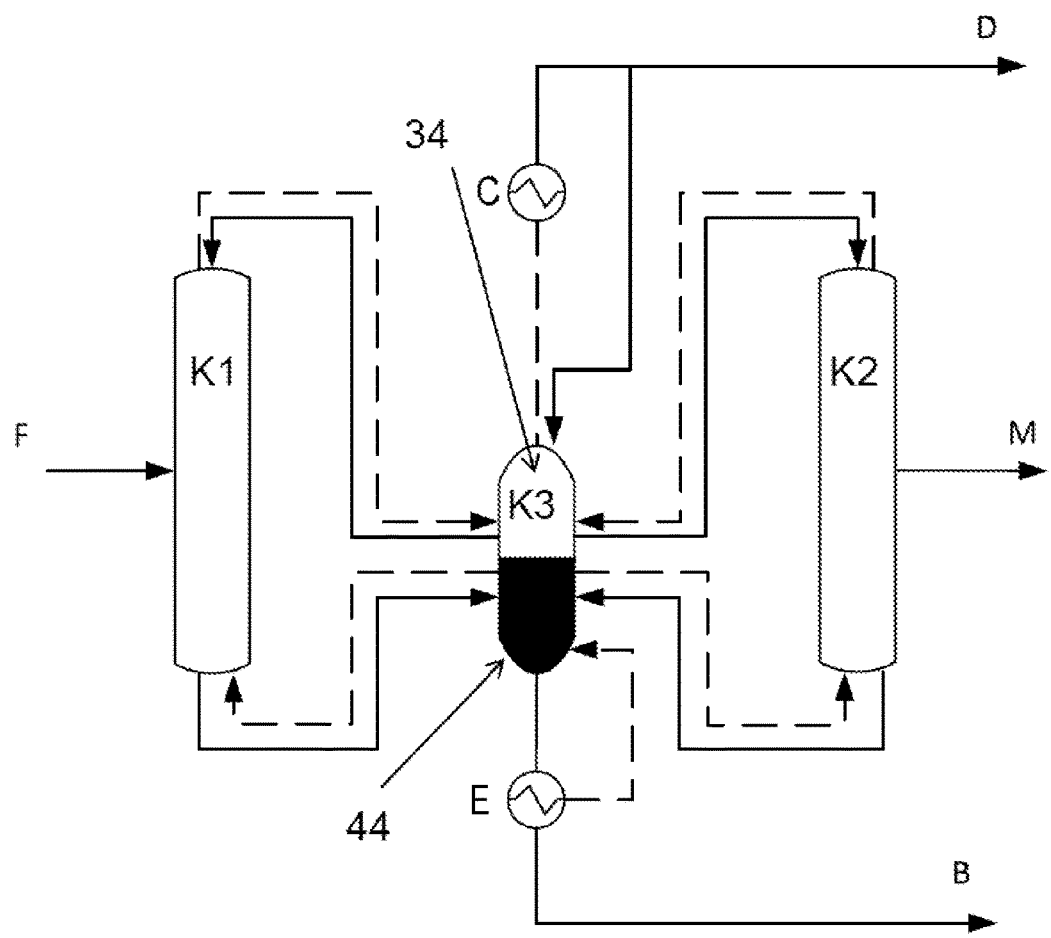
FIG. 4 shows a column configuration according to the invention and consisting of three columns for separation of a three-component mixture.

The two columns K1 and K2 in FIG. 4 are communicatively connected to column K3 via pipelines.

Here, the columns K1 and K2 correspond to the left- and right-hand side respectively of the dividing wall sections of an equivalent dividing wall column.

The column K3 consists of a stripping section 44 (black) and a rectifying section 43 separated by a horizontal dividing plate.

The two sections in column K3 therefore correspond to the combined stripping and rectifying section of the equivalent dividing wall column.

Figure 2:
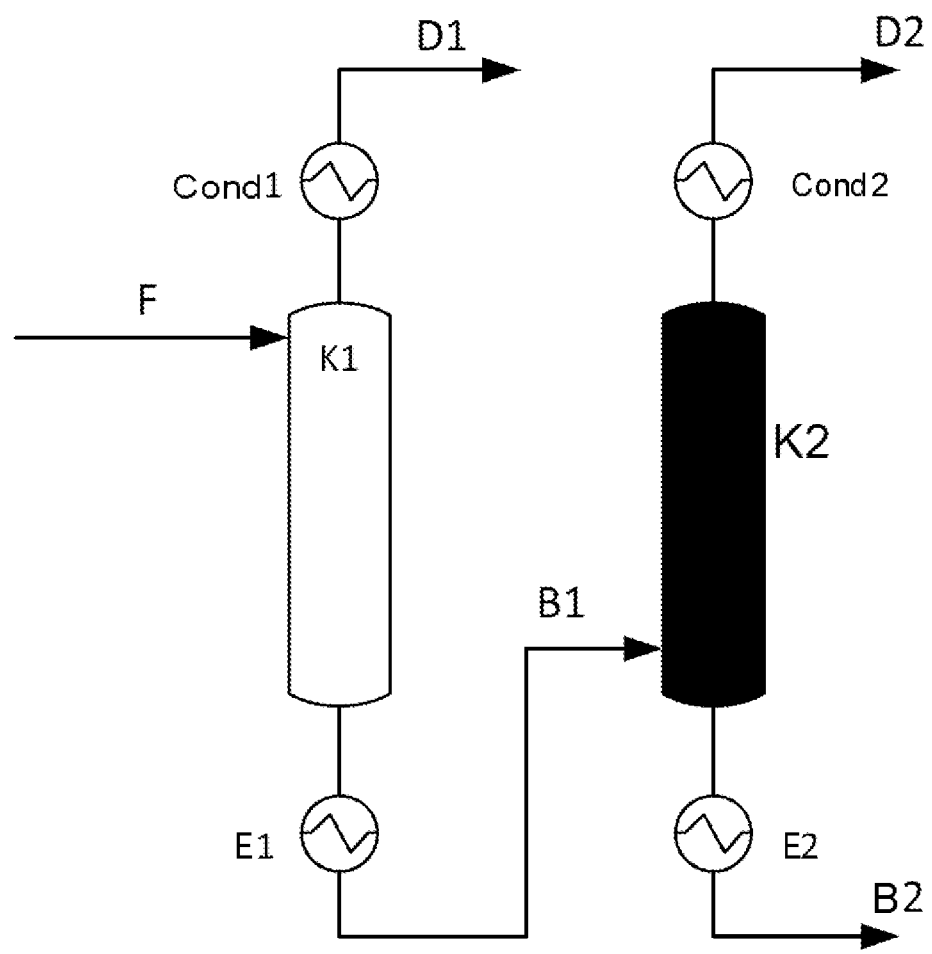
FIG. 2 shows a conventional distillation arrangement composed of a stripping column including an evaporator and a condenser and of a rectification column including an evaporator and a condenser.
Figure 3:
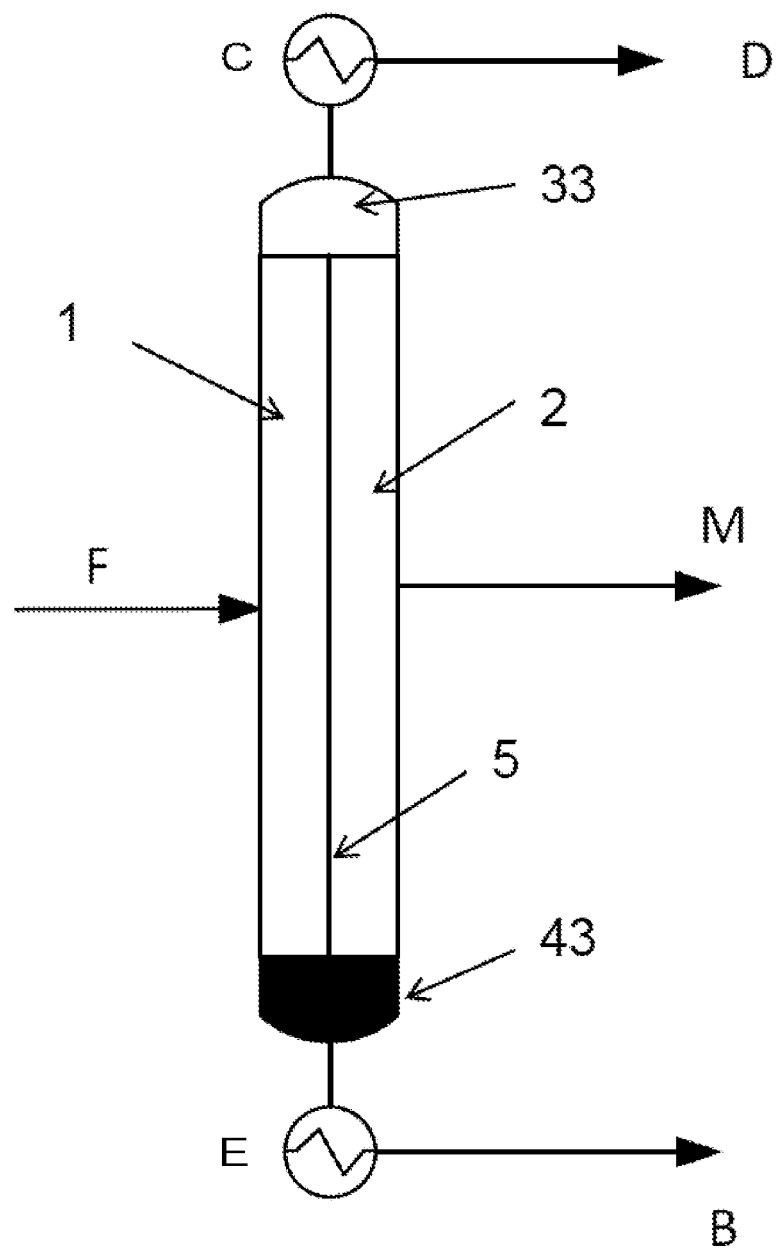
FIG. 3 shows a dividing wall column for separation of a three-component mixture according to the prior art.

The invention is preferably employed when an existing column system is available—as shown in FIG. 2 for example—but dividing wall column technology according to FIG. 3 is to be used instead.

Since the embodiment according to FIG. 4 is equivalent to a dividing wall column, in this way only one additional smaller column, which is connected to the two existing columns via pipelines, need be procured.

This new column is additionally provided with at least one evaporator E and at least one condenser C.

In this way, the capital investment for dividing wall technology is reduced considerably when existing apparatuses K1 and K2 require no further modification. Only the cost of the connection to the column K3 needs to be considered.

When the column K3 is sensibly dimensioned, the invention raises the possible throughput of the plant by up to 80% of the existing maximum capacity.

The distillation columns used in the invention are preferably provided with separating plates of different types such as separating trays (e.g. sieve trays, fixed valves), random packings (packing bodies) or structured packings. The internals are determinants of separation performance and the pressure drop over the distillation columns.

The distillation columns described preferably comprise 1-200 theoretical plates, the number of theoretical plates necessary being dependent on the quality, i.e., the degree of contamination of the starting mixture to be fractionated, the specified purity requirements for the target product and the relative volatility of the individual components of the multicomponent mixture, with respect to the key component.

The distillation columns are preferably operated at an off-gas pressure of from −1 to +10 bar and a boiling temperature range of from −20 to +200° C.

With regard to an integrated distillation system composed of two or more individual apparatuses, the off-gas pressure selected may be different, taking economic aspects into account.

The column K3 is preferably provided with one or more evaporator systems for supplying heat energy. In a conventional evaporator system, one or more heat generators are flanged to the column body of an individual apparatus via connectors/adapters. The column body is preferably provided with a further connection for a second evaporator system.

From an engineering standpoint a wide variety of heat generator designs are possible, but a natural circulation evaporator is preferred.

Preferred operating media for the evaporation are water vapor and/or thermal oils of various pressure and temperature ratings. The choice of the suitable operating media is determined primarily by economic aspects and by availability.

When the distillation columns K1 and K2 are coupled to column K3 as per FIG. 4, it is preferable for at least one vapor pipe of the respective column to be directly connected to the body of column K3.

Appropriate return lines are connected from the column K3 directly to the column body of K1 and K2 for the reflux to the two columns K1 and K2.

Furthermore, the liquid streams at the bottom of the two columns K1 and K2 are passed directly into the rectifying section of column K3 via appropriate pipelines. These liquid streams serve as reflux in the rectifying section of the column K3. The vapors from column K3 are fed back into the two columns K1 and K2 via appropriate pipelines. Existing flange connections on the columns K1 and K2 can be used therefor.

In addition, the column K3 is preferably provided with one or more condensing systems to condense the vapor and hence to provide the reflux volume into column K3.

The components not condensable in the first condensation step, composed of components having relatively low boiling points and/or inert gas, are preferably supplied to a further condensation step and/or a further work-up/another use (preferably a scrubber system).

Preferred operating media for the condensation are cooling water and/or cooling brine of various pressure and temperature ratings. The choice of suitable operating media is determined primarily by economic aspects and by availability.

The columns K1 and K2 preferably comprise one or more feed and product draw ports along the respective column jacket. A useful position on the circumference and height of the column body is selected according to the thermodynamic design.

EXAMPLE AND COMPARATIVE EXAMPLE

Comparative Example—Conventional Connection

FIG. 2 shows a conventional distillation arrangement comprising stripping column K1 including evaporator E1 and condenser Cond1 and also rectification column K2 including evaporator E2 and condenser Cond2 for separation of a three-component mixture.

The material stream F consists of a chlorosilane-containing mixture having a low boiler fraction, middle boiler fraction and a high boiler fraction.

The low boiler fraction is removed in column K1 via material stream D1.

The material stream B1 is passed into the second column K2 in which the high boiler fraction is drawn off via material stream B2 and the target product (middle boiler fraction) via material stream D2.

Table 1 shows the mass fractions of the individual components in the respective substreams according to the comparative example.

TABLE 1

| Component | Material stream | | | | |
|---|---|---|---|---|---|
| | F | D1 | B1 | D2 | B2 |
| TCS | 99.5% | 90% | 99.9% | 99.99% | 99.99% |
| DCS | 0.5% | 10% | — | — | — |
| C1 | <10 ppmw | — | 10 ppmw | 1 ppmw | 300 ppmw |
| C2 | <0.5 ppmw | 10 ppmw | 0.04 ppmw | 0.04 ppmw | — |
| C3 | <10 ppmw | 20 ppmw | — | — | — |

C1-C3 are trace impurities such as methylchlorosilanes, hydrocarbons and dopant compounds.

Example

FIG. 4 shows a preferred embodiment of a column configuration according to the invention, comprising a first column K1, a second column K3 and a third column K2 including evaporator E and condenser C.

The material stream F consists of a chlorosilane-containing mixture having a low boiler fraction, middle boiler fraction and a high boiler fraction. This material stream is introduced into column K1.

In column K3, the low boiler fraction (comprising DCS and C3) is removed via material stream D. The high boiler fraction (comprising C1) is likewise removed in column K3 via material stream B.

In column K2, the target product M (middle boiler fraction, comprising TCS) is withdrawn via a side draw.

Table 2 shows the mass fractions of the individual components in the respective substreams according to the example.

TABLE 2

| Component | Material stream | | | |
|---|---|---|---|---|
| | F | D | B | M |
| TCS | 99.5% | 90% | 99.9% | 99.99% |
| DCS | 0.5% | 10% | — | — |
| C1 | <10 ppmw | — | 300 ppmw | 1 ppmw |
| C2 | <0.5 ppmw | 10 ppmw | — | 0.04 ppmw |
| C3 | <10 ppmw | 20 ppmw | — | — |

It can be seen that, compared to the comparative example, one evaporator and one condenser can be dispensed with.

The invention claimed is:

1. A process for distillative separation of a mixture (F) of three or more components and comprising at least one low boiler, at least one middle boiler and at least one high boiler, comprising:
    supplying the mixture (F) of three or more components to a first distillation column (K1), wherein three distillation columns (K1, K2, K3) are present which are coupled with one another so as to allow mass transfer such that:
    overhead vapors from a first distillation column (K1) are communicatively connected to a rectifying section of a second distillation column (K3),
    the rectifying section of the second distillation column (K3) is communicatively connected to the overhead vapors of a third distillation column (K2);
    bottom draws from the first distillation column (K1) are communicatively connected to a stripping section of the second distillation column (K3), and
    the stripping section of the second distillation column (K3) is communicatively connected to a bottom of the third distillation column (K2),
    wherein the second distillation column (K3) comprises a horizontal impermeable dividing wall dividing the stripping section and rectifying section of the second distillation column (K3), wherein the second distillation column (K3) comprises an evaporator (E) and also a condenser (C), wherein a bottoms fraction (B) comprising at least one high boiler and a tops fraction (D) comprising at least one low boiler are removed from the second distillation column (K3), and wherein at least one middle boiler (M) is removed from a side draw of the third distillation column (K2).

2. The process of claim 1, wherein the distillation columns (K1, K2, K3) are operated at an off-gas pressure of from −1 bar to 10 bar and a boiling temperature range of from 20° C. to 200° C.

3. The process of claim 1, wherein at least the second distillation column (K3) comprises one or more evaporator systems (E) using water vapor and/or thermal oils as thermal operating media.

4. The process of claim 2, wherein at least the second distillation column (K3) comprises one or more evaporator systems (E) using water vapor and/or thermal oils as thermal operating media.

5. The process of claim 1, wherein at least the second distillation column (K3) comprises one or more condensation systems (C) using cooling water or cooling brine as thermal operating media.

6. The process of claim 2, wherein at least the second distillation column (K3) comprises one or more condensation systems (C) using cooling water or cooling brine as thermal operating media.

7. The process of claim 3, wherein at least the second distillation column (K3) comprises one or more condensation systems (C) using cooling water or cooling brine as thermal operating media.

8. The process of claim 4, wherein at least the second distillation column (K3) comprises one or more condensation systems (C) using cooling water or cooling brine as thermal operating media.

9. The process of claim 5, wherein top stream components not condensable in a first condensation step in the condensation system (C) are supplied to a further condensation step and/or a scrubber system.

10. The process of claim 1, wherein the mixture of three or more components comprises chlorosilanes as middle boilers.

11. An apparatus suitable for the distillative separation of a mixture (F) of three or more components of claim 1, comprising three distillation columns (K1, K2, K3) coupled with one another so as to allow mass transfer, such that:

vapors from a first distillation column (K1) are communicatively connected to a rectifying section of a second distillation column (K3), the rectifying section of the second distillation column (K3) is communicatively connected to the overhead vapors of a third distillation column (K2), bottom draws from the first distillation column (K1) are communicatively connected to a stripping section of the second distillation column (K3), the stripping section of the second distillation column (K3) is communicatively connected to a bottom of third distillation column (K2), wherein the second distillation column (K3) comprises a horizontal impermeable dividing wall and further comprises an evaporator and also a condenser, and wherein the third distillation column (K2) comprises a top draw and a bottom draw, and one or more side draws below the top draw and above the bottom draw.

12. The apparatus of claim 11, wherein the first and the third distillation columns (K1, K2) each comprise 1-200 theoretical plates.

13. The apparatus of claim 11, wherein at least the second distillation column (K3) comprises one or more evaporator systems (E) for evaporating liquid bottom streams and each of said evaporator systems is flanged to the column body.

14. The apparatus of claim 12, wherein at least the second distillation column (K3) comprises one or more evaporator systems (E) for evaporating liquid bottom streams and each of said evaporator systems is flanged to the column body.

15. The apparatus of claim 11, wherein at least the second distillation column comprises one or more condensation systems (C) for condensing vaporous streams.

16. The apparatus of claim 12, wherein at least the second distillation column comprises one or more condensation systems (C) for condensing vaporous streams.

17. The apparatus of claim 13, wherein at least the second distillation column comprises one or more condensation systems (C) for condensing vaporous streams.

* * * * *